United States Patent
Watanabe

(10) Patent No.: US 12,046,078 B2
(45) Date of Patent: Jul. 23, 2024

(54) ACCIDENT DETECTION DEVICE AND ACCIDENT DETECTION METHOD

(71) Applicant: Panasonic Corporation, Osaka (JP)

(72) Inventor: Takeshi Watanabe, Kanagawa (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 357 days.

(21) Appl. No.: 17/439,708

(22) PCT Filed: Jan. 14, 2020

(86) PCT No.: PCT/JP2020/000886
§ 371 (c)(1),
(2) Date: Sep. 15, 2021

(87) PCT Pub. No.: WO2020/188972
PCT Pub. Date: Sep. 24, 2020

(65) Prior Publication Data
US 2022/0165092 A1    May 26, 2022

(30) Foreign Application Priority Data
Mar. 19, 2019  (JP) .................................. 2019-051409

(51) Int. Cl.
*G06V 40/20*   (2022.01)
*G06V 20/52*   (2022.01)

(52) U.S. Cl.
CPC ............. *G06V 40/20* (2022.01); *G06V 20/52* (2022.01)

(58) Field of Classification Search
CPC .................................. G06T 7/20; G06V 20/52
See application file for complete search history.

(56) References Cited

U.S. PATENT DOCUMENTS

| | | | |
|---|---|---|---|
| 10,943,463 B1 * | 3/2021 | Clark | G08B 21/0438 |
| 2007/0027583 A1 * | 2/2007 | Tamir | H01L 23/49838 701/1 |
| 2018/0253607 A1 * | 9/2018 | Ng | G08B 17/125 |
| 2018/0338120 A1 * | 11/2018 | Lemberger | G06V 20/41 |
| 2019/0164020 A1 * | 5/2019 | Sabripour | G06F 18/24 |

(Continued)

FOREIGN PATENT DOCUMENTS

| | | |
|---|---|---|
| CN | 108852760 | 11/2018 |
| JP | 2008-009498 | 1/2008 |
| JP | 2008-174320 | 7/2008 |

(Continued)

OTHER PUBLICATIONS

English translation of Search Report dated Feb. 28, 2023 issued in Chinese Patent Application No. 202080021917.3.

(Continued)

*Primary Examiner* — Di Xiao
(74) *Attorney, Agent, or Firm* — GREENBLUM & BERNSTEIN, P.L.C.

(57) ABSTRACT

An accident detection device is provided with: a possession detection unit that uses a photographed images from a surveillance camera to detect a person and a possession, which is an object possessed by the person; and an accident determination unit that determines whether an accident has occurred on the basis of movement of the person and the possession in the photographed images from the surveillance camera.

8 Claims, 7 Drawing Sheets

(56) References Cited

U.S. PATENT DOCUMENTS

2019/0228803 A1\* 7/2019 Tadaoka ............... G11B 19/041
2020/0082712 A1\* 3/2020 Back .................... G08G 1/0116

FOREIGN PATENT DOCUMENTS

JP    2017-28561    2/2017
JP    2020-71717    5/2020

OTHER PUBLICATIONS

International Search Report issued in International Pat. Appl. No. PCT/JP2020/000886, dated Mar. 17, 2020, along with an English translation thereof.

\* cited by examiner

ACCIDENT DETECTION DEVICE AND ACCIDENT DETECTION METHOD

TECHNICAL FIELD

The present disclosure relates to an accident detection apparatus and an accident detection method.

BACKGROUND ART

A technology for detecting a fall of a person by using an image captured by a surveillance camera is known. Patent Literature (hereinafter, referred to as "PTL") 1 discloses a technology for detecting a change in posture of a person from an image captured by a surveillance camera which is installed in the vicinity of an escalator and detecting a fall of a person by the magnitude of the change in posture.

CITATION LIST

Patent Literature

PTL 1
Japanese Patent Application Laid-Open No. 2008-9498

SUMMARY OF INVENTION

Technical Problem

However, in a place where more than one person is present such as an escalator, a person in the back may be hidden behind a person in the front in a captured image. In this case, the technology of PTL 1 possibly does not detect the fall of the person in the back.

One non-limiting and exemplary embodiment of the present disclosure facilitates providing a technology for reducing a detection failure in the case of detecting occurrence of an accident such as a fall of a person from an image taken by capturing a place where more than one person may be present.

Solution to Problem

An accident detection apparatus according to an aspect of the present disclosure includes: a detector that detects a person and a possession which is an object in the possession of the person by using an image captured by a camera device; and a determiner that determines whether an accident has occurred, based on movements of the person and the possession in the image captured by the camera device.

It should be noted that general or specific embodiments may be implemented as a system, an apparatus, a method, an integrated circuit, a computer program or a storage medium, or may be implemented as any combination of a system, an apparatus, a method, an integrated circuit, a computer program, and a storage medium.

According to an non-limiting and exemplary embodiment of the present disclosure, it is possible to reduce a detection failure in the case of detecting occurrence of an accident such as a fall of a person from a captured image of a place where a plurality of persons may be present.

Additional benefits and advantages of the disclosed aspect will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Hereinafter, an embodiment of the present disclosure will be described in detail with reference to the accompanying drawings as appropriate. However, more detailed description than necessary may be omitted. For example, detailed descriptions of already well-known matters and repeated descriptions for substantially the same configuration may be omitted. This is to prevent the following description from becoming unnecessarily redundant and to facilitate understanding by those skilled in the art.

Note that, the accompanying drawings and the following description are provided so that those skilled in the art understand the present embodiment sufficiently, and are not intended to limit the subject matters recited in the claims.

Embodiment

<Configuration of System>

Figure 1:
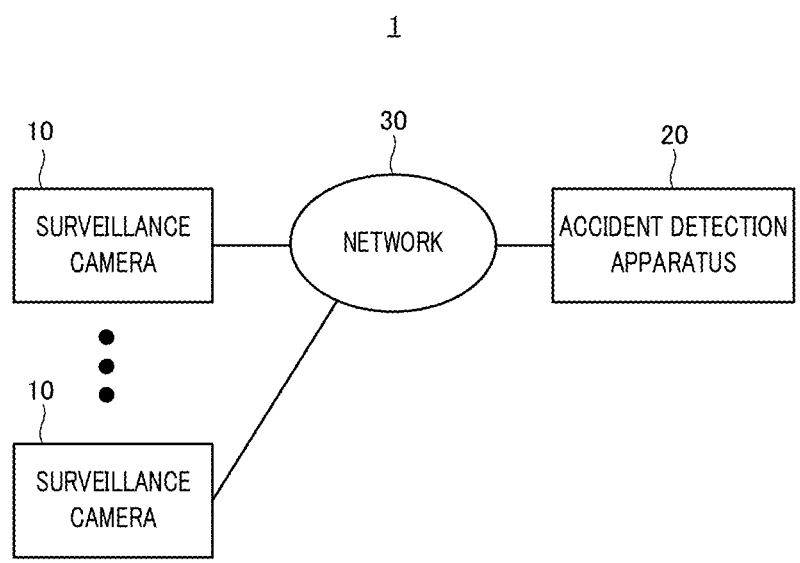
FIG. 1 illustrates an exemplary configuration of an accident detection system according to an embodiment of the present disclosure.

FIG. 1 illustrates an exemplary configuration of an accident detection system.

As illustrated in FIG. 1, accident detection system 1 includes surveillance cameras 10, and accident detection apparatus 20. Surveillance cameras 10 and accident detection apparatus 20 are connected to each other via wired and/or wireless network 30. The number of surveillance cameras 10 may be one or plural.

Surveillance cameras 10 are installed in various places in a predetermined area. For example, surveillance camera 10 may be installed in a place where a person is likely to fall, such as an escalator, a stairway, and a slope in a commercial facility. Surveillance camera 10 may also be installed in a place different from the place where a person is likely to fall. For example, surveillance camera 10 may be installed in a place where a person and an object in the possession of the person (hereinafter, the object is referred to as a "possession") can be captured. Examples of possessions include a shopping bag, a handbag, a stick, and a carry case.

Figure 2C:
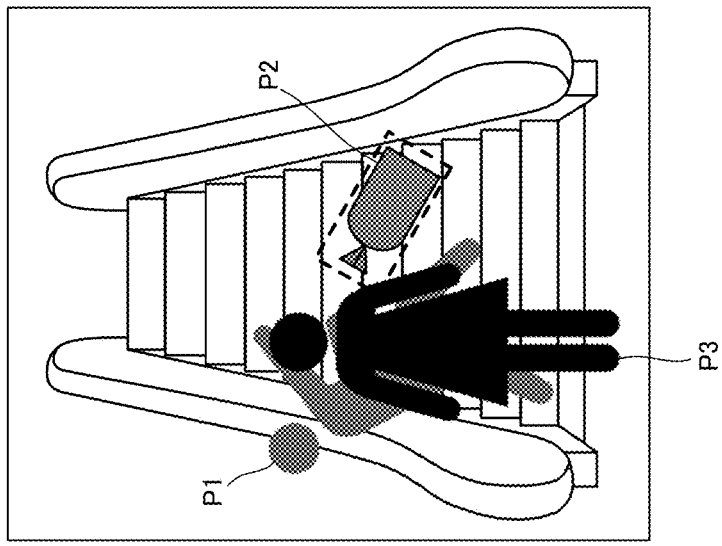
FIG. 2(A), FIG. 2(B) and FIG. 2(C) illustrate an exemplary operation of the accident detection system according to the embodiment.
Figure 2B:
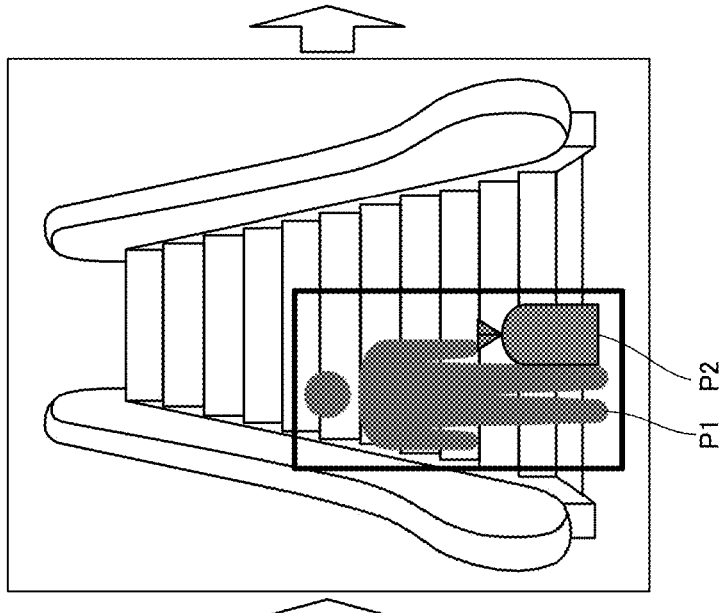
Figure 2A:
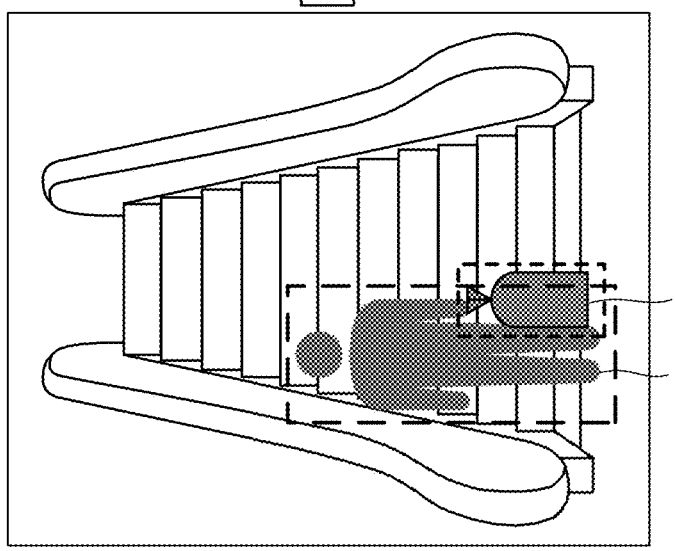

Accident detection apparatus 20 detects occurrence of an accident such as a fall of a person, based on an image captured by surveillance camera 10 (hereinafter referred to as a "captured image"). The captured image may be either of a still image or a moving image. Next, with reference to FIG. 2, an exemplary method will be described in which accident detection apparatus 20 detects a fall of a person. In FIGS. 2, (A), (B) and (C) are exemplary captured images of riding positions of an escalator.

First, as illustrated in (A) of FIG. 2, accident detection apparatus 20 detects person P1 before riding on the escalator, and object P2 from the captured image. Next, as illustrated in (B) of FIG. 2, accident detection apparatus 20 associates person P1 that has been detected and object P2 that person P1 carries (i.e., "possession") with each other.

Thereafter, accident detection apparatus 20 determines that person P1 has fallen when detecting an unusual movement or posture of person P1 on the escalator from the captured image. In addition, as illustrated in (C) of FIG. 2, when detecting, from the captured image, an unusual movement of possession P2 carried by person P1 on the escalator, accident detection apparatus 20 determines that person P1 that carries possession P2 has fallen. When determining that person P1 has fallen, accident detection apparatus 20 outputs a warning.

As described above, accident detection apparatus 20 determines whether person P1 has fallen based on the movement of possession P2 carried by person P1, in addition to the movement or posture of person P1. Thus, as illustrated in (C) of FIG. 2, accident detection apparatus 20 can detect a fall of person P1 who is hidden behind person P3 in the front and whose movement or posture cannot be detected. As a result, accident detection apparatus 20 can reduce a detection failure of a fall of a person. A detailed description is as follows.

<Configuration of Accident Detection Apparatus>

Figure 3:
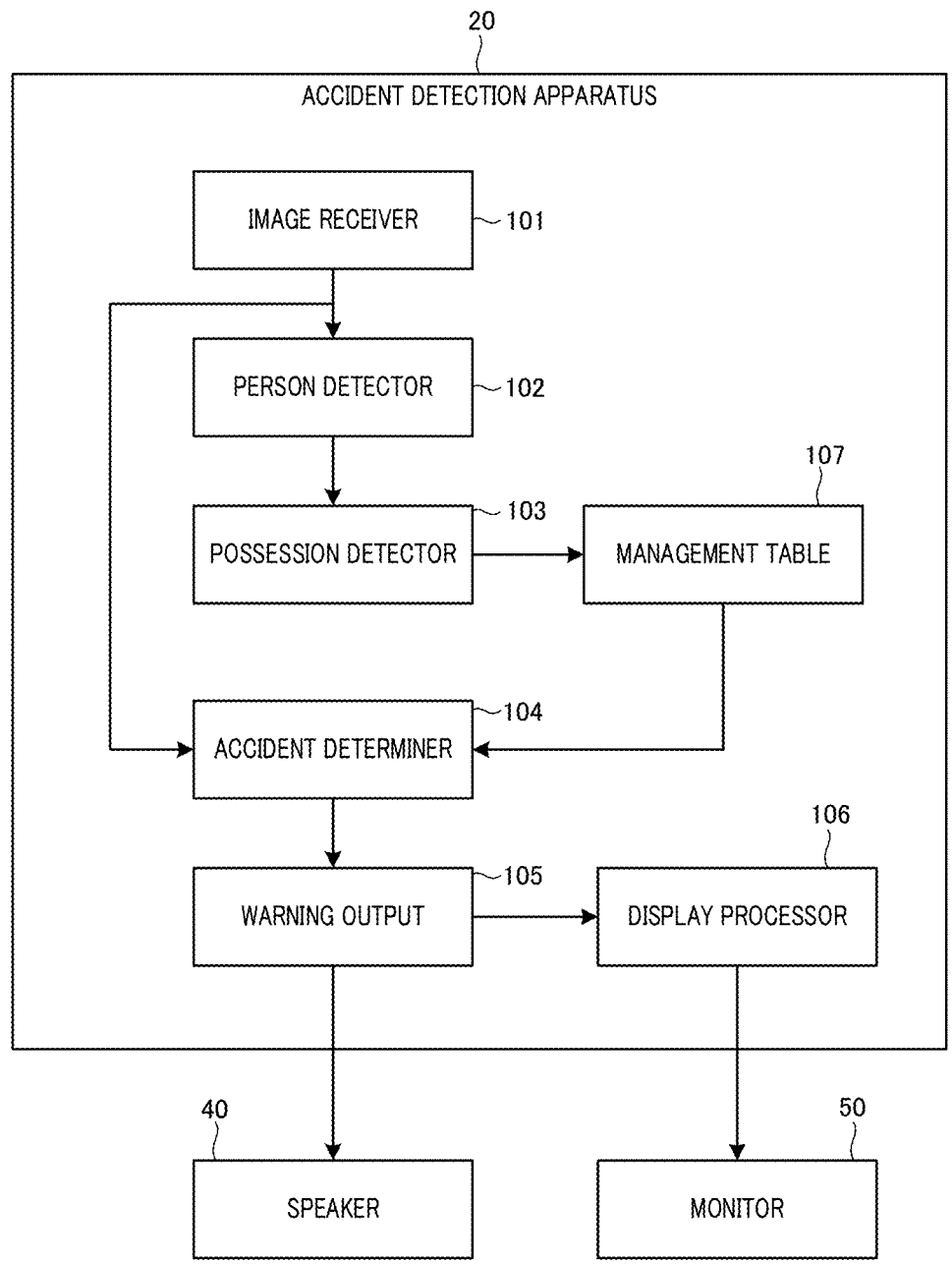
FIG. 3 illustrates an exemplary configuration of an accident detection apparatus according to the embodiment.

FIG. 3 illustrates an exemplary configuration of accident detection apparatus 20.

As illustrated in FIG. 3, accident detection apparatus 20 includes image receiver 101, person detector 102, possession detector 103, accident determiner 104, warning output 105, display processor 106, and management table 107.

Image receiver 101 receives a captured image from surveillance camera 10 via network 30.

Person detector 102 detects a person included in the captured image received by image receiver 101. Various technologies are known for detecting a person from an image. For example, a method for detecting a person by identification of an Ω-like shape formed by a head and a shoulder of a person, a method for detecting a person by using an identifier which has learned, by deep learning in advance, two classifications of whether or not an object is a person, or the like can be adopted.

Possession detector 103 detects a possession carried by the person included in the captured image. For example, possession detector 103 detects the possession by the following processing. First, possession detector 103 detects objects included in the captured image. Various technologies are known for detecting an object from an image. Next, possession detector 103 specifies, among the detected objects, the object in the possession of the person detected by person detector 102 (i.e., "possession"). In one example, possession detector 103 specifies, as a possession of the person, an object which is positioned within a predetermined distance from a position of the person included in the captured image and moving in the same direction as the person.

Possession detector 103 registers identification information on the specified possession and identification information on the person carrying the possession in management table 107 in association with each other. The identification information on the possession is information for identifying the possession from an image to be captured later or an image captured by another surveillance camera 10. The identification information on the person is information for identifying the person from an image to be captured later or an image captured by another surveillance camera 10.

Incidentally, possession detector 103 may determine a type of the possession based on the identification information on the possession. In addition, possession detector 103 may register the type of the determined possession in management table 107.

Accident determiner 104 determines whether a fall accident of the person has occurred in a place where the captured image has been captured based on the movement or posture of the person or the movement of the possession included in the captured image received by image receiver 101. For example, accident determiner 104 determines whether the accident has occurred as follows.

Accident determiner 104 determines that a fall accident of a person has occurred when detecting a person with an unusual movement or posture from the captured image. A usual movement or posture of a person may be a movement in which the person is walking, or a posture in which the person is standing. Various technologies are known for detecting a difference in movements or postures of a person.

Accident determiner 104 determines that a fall accident of a person has occurred when detecting a possession with an unusual movement from the captured image. A usual movement of a possession may be a movement in the same direction as a moving direction of a person. That is, the unusual movement of a possession may be a movement of the possession in a direction different from the moving direction of the person, a movement of the possession in a direction opposite to a running direction of the escalator, or a separation of the possession by a distance not less than a predetermined distance from the person. Alternatively, the unusual movement of a possession may be a fall, dropping, tumble, scatter, and the like of the possession. Various technologies are known for detecting the movement of an object.

Incidentally, accident determiner 104 may detect the possession from the captured image by using the identification information on the possession registered in management table 107. Thus, an object different from the possession (for example, an object that is installed in advance) is not subject to the above-described determination, as a result, a processing load in accident determiner 104 is reduced. Thus, accident determiner 104 can determine whether the fall accident of the person has occurred in a shorter time.

Besides, the captured image used for detection by person detector 102 and possession detector 103 which are described above (hereinafter referred to as "the first captured image") and the captured image used for determination by accident determiner 104 (hereinafter referred to as "the second captured image") may be the same or may be different. For example, the second captured image may be an image captured later than the first captured image. The second captured image may also be an image captured by surveillance camera 10 different from the surveillance camera that has captured the first captured image. For example, person detector 102 and possession detector 103 may detect a person and a possession by using a captured image capture by surveillance camera 10 installed in a place where the person and the possession are clearly captured (i.e., the first captured image), while accident determiner 104 may determine whether an accident has occurred from a captured image from surveillance camera 10 installed in the place where an accident is likely to occur (i.e., the second captured image) by using the detection result. Thus, recognition accuracy of the person and the possession is improved, and accuracy of the accident determination based on the movement of the possession is also improved.

In addition, accident determiner 104 may determine whether the fallen person has carried a possession. For example, when detecting an accident based on the movement of a possession, accident determiner 104 may determine that the fallen person has carried the possession. Moreover, when detecting an accident based on the movement or posture of the person, accident determiner 104 may determine that the fallen person has carried a possession in a case where the possession is associated with the person in management table 107.

Warning output 105 outputs warning information indicating the occurrence of an accident when accident determiner 104 determines that the accident has occurred. For example, warning output 105 turns on a rotating light or outputs a warning sound to speaker 40. Warning output 105 also outputs warning information to monitor 50 through display processor 106.

Display processor 106 generates a UI image for monitoring and outputs the generated UI image to monitor 50. Note that, a detailed description of display processor 106 will be given later.

<Detection Processing for Person and Possession>

Figure 4:
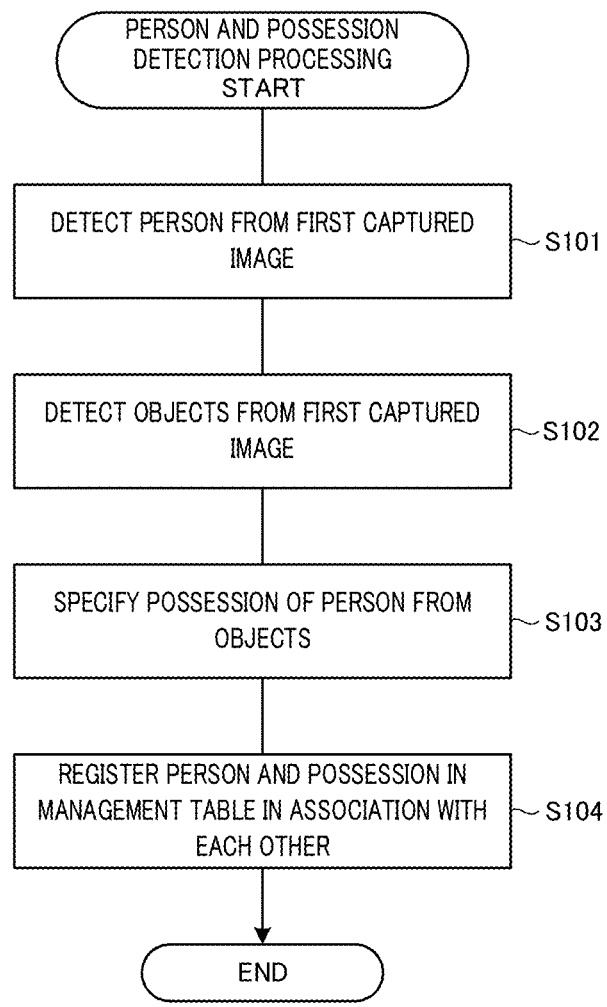
FIG. 4 is a flowchart illustrating an example of detection processing for a person and a possession according to the embodiment.

With reference to a flowchart illustrated in FIG. 4, an example of detection processing for a person and a possession will be described.

Person detector 102 detects a person from the first captured image and generates identification information on the person (S101).

Possession detector 103 detects objects from the first captured image (S102). Next, possession detector 103 specifies, among the detected objects, an object that is carried by the person detected in S101 (i.e., a possession), and generates identification information on the possession (S103).

Possession detector 103 registers the identification information on the specified possession generated in S103 and the identification information on the person carrying the possession in management table 107 in association with each other (S104). This processing thus ends (END). Note that, accident detection apparatus 20 may perform this processing for each time when image receiver 101 receives a captured image.

<Accident Determination Processing>

With reference to a flowchart illustrated in FIG. 5, an example of accident determination processing will be described. Incidentally, the processing illustrated in FIG. 4 and the processing illustrated in FIG. 5 may be performed in parallel with each other.

An accident detector determines whether a person with an unusual movement or posture is present in the second captured image (S201).

In a case where the person with the unusual movement or posture is present in the second captured image (S201: YES), accident determiner 104 determines that a fall accident of the person has occurred (S210). In this case, warning output 105 outputs warning information (S211). This processing thus ends (END).

In a case where a person with the unusual movement or posture is not present in the second captured image (S201: NO), the accident detector performs the following processing of S202. That is, the accident detector determines whether a possession with an unusual movement is present in the second captured image (S202). This possession may be the possession registered in management table 107.

In a case where a possession with an unusual movement is present in the second captured image (S202: YES), accident determiner 104 determines that a fall accident of a person has occurred (S210). In this case, warning output 105 outputs warning information (S211). This processing thus ends.

In a case where a possession with an unusual movement is not present in the second captured image (S202: NO), accident determiner 104 determines that a fall accident of a person has not occurred (S212). This processing thus ends. Note that, accident detection apparatus 20 may perform this processing for each time when image receiver 101 receives a captured image.

According to the above processing, it is possible to determine whether a fall accident of a person has occurred based on the movement of at least one of the person and the possession. Hence, as illustrated in (C) of FIG. 2, it is possible to detect a fall of a person who is hidden behind a person in the front and whose movement or posture cannot be detected.

Figure 5:
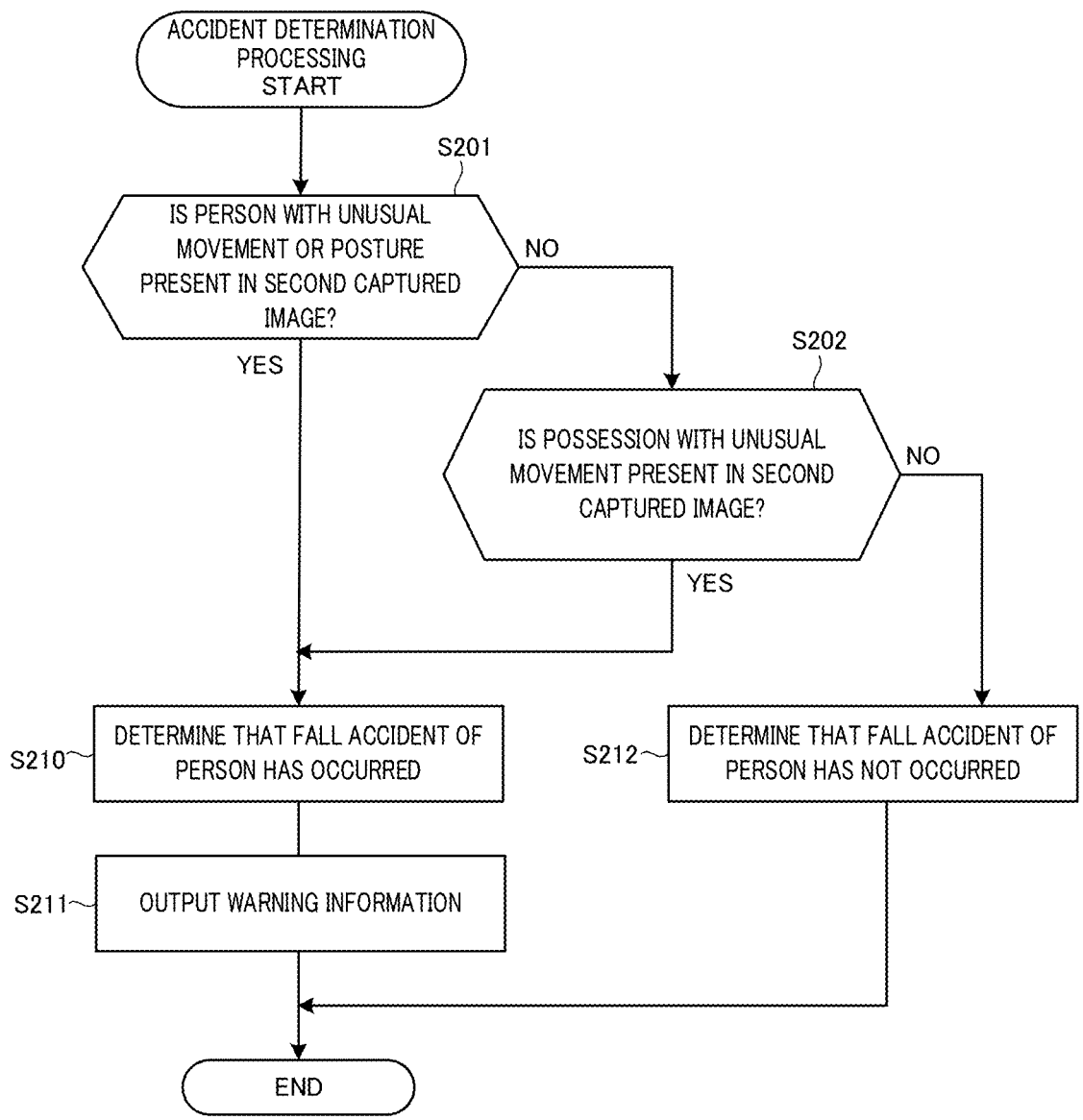
FIG. 5 is a flowchart illustrating an example of accident determination processing according to the embodiment.

Note that, the processing illustrated in FIG. 5 is an merely example. For example, accident determiner 104 may perform firstly the determination of S202 and then perform the determination of S201. Alternatively, accident determiner 104 may perform the determination of S201 and S202 collectively with respect to the second captured image.

<Details of Display Processor>

Figure 6:
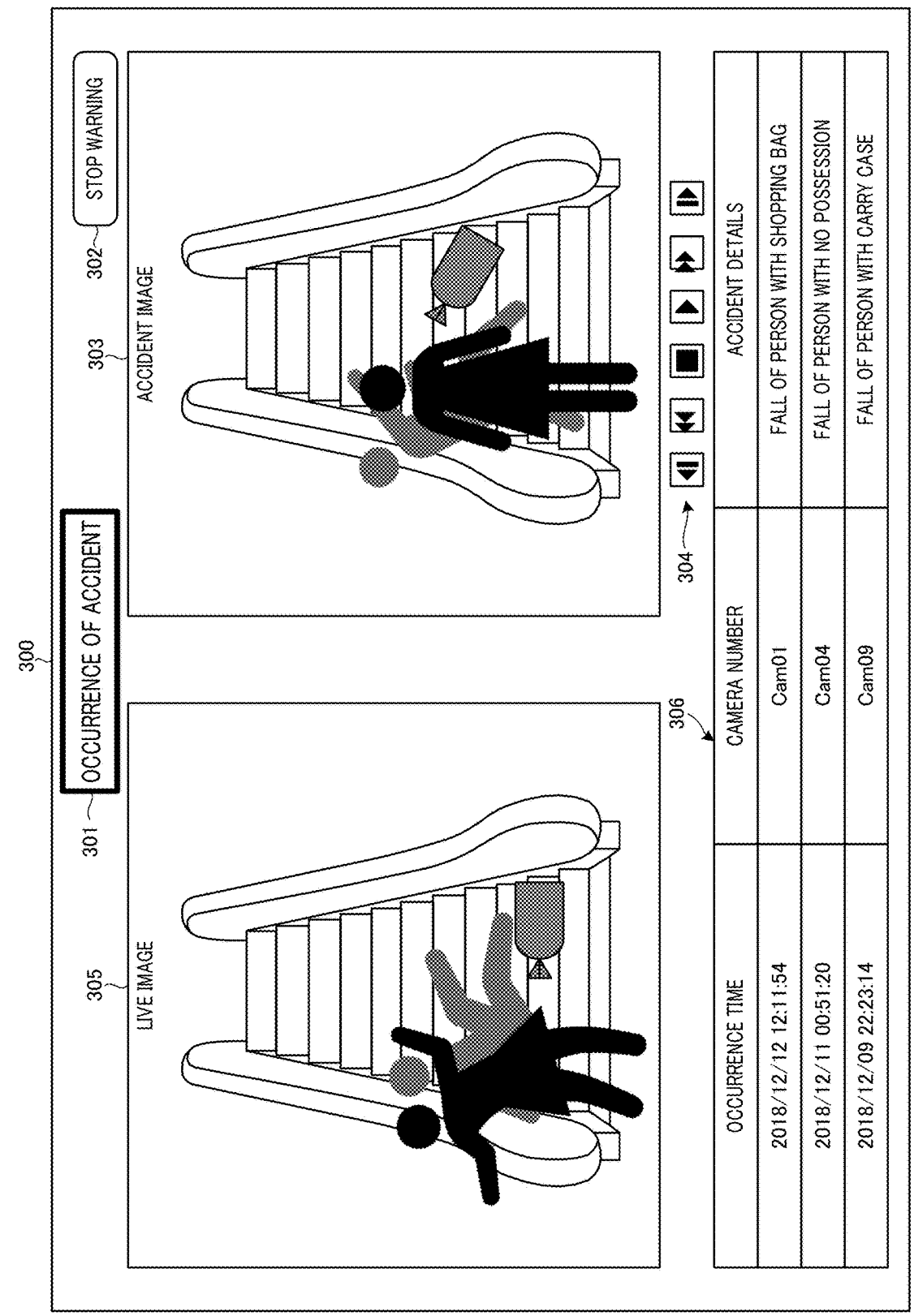
FIG. 6 illustrates a display example of a User Interface (UI) for recognition of an accident according to the embodiment.

Next, with reference to FIG. 6, display processor 106 will be described in detail. Display processor 106 generates UI for recognition of an accident (hereinafter referred to as "accident recognition UI") 300 as illustrated in FIG. 6 and outputs, to monitor 50, the accident recognition UI as an image. Display processor 106 also processes an input operation for accident recognition UI 300 by an observer of monitor 50.

As illustrated in FIG. 6, accident recognition UI 300 includes warning display area 301, warning stop button 302, accident image area 303, accident image operation buttons 304, live image area 305, and accident history area 306.

Display processor 106 displays warning information on warning display area 301 in a case where the warning information is output from warning output 105. This allows the observer to immediately recognize occurrence of an accident. At this time, a warning sound may be output from speaker 40.

In a case where alarm stop button 302 is pressed, display processor 106 stops displaying the warning information on alarm display area 301. In addition, the warning sound from speaker 40 is also stopped.

When the warning information is output from warning output 105, display processor 106 displays, on accident image area 303, the second captured image (still image) in which accident determiner 104 determines that the accident has occurred. Thus, the observer can recognize a situation in the occurrence of the accident.

Display processor 106 replays, stops, rewinds, and fast-forwards the captured image on accident image area 303 in a moving image in response to an operation of accident image operation button 304. Thus, the observer can recognize a situation including before and after the occurrence of the accident. Moreover, in a case where a display screen is a touchscreen, the moving image may be automatically rewound for a predetermined time (about 5 seconds) from the accident image and replayed from there, by tapping the accident image.

When the warning information is output from warning output 105, display processor 106 displays, on live image area 305, a present (i.e., live) captured image in surveillance camera 10 which has captured the second captured image. This allows the observer to recognize the current situation of a place where the accident has occurred. Moreover, a live image such as a still image that is updated at a predetermined period (about 10 seconds) or a moving image may be displayed on live image area 305.

Display processor 106 displays, on accident history area 306, information on an accident that had occurred in the past at the place where the occurrence of the accident has been detected (hereinafter referred to as "accident history information"). This allows the observer to analyze the accidents that have occurred at the place. The accident history information may include a time of the occurrence of the accident, an identification number of surveillance camera 10 that has detected the accident, and details of the accident.

Note that, the details of the accident may include information on whether the fallen person has carried a possession. In addition, the details of the accident may include the type of possession that the fallen person has carried. This allows the observer to analyze a cause of occurrence of the accident in detail.

<Variation>

In the above, a description has been given with an example of a fall accident of a person; however, accident detection apparatus 20 may detect an accident different from a fall of a person. For example, accident detection apparatus 20 may detect an accident such as a fall and tumble of an object.

In addition, the captured images of the riding positions on the escalator illustrated in FIGS. 2 and 6 are merely examples, and thus, a captured image of any place, such as a middle position and riding-off position on the escalator, may be available. Moreover, as described above, a captured image of a place different from the escalator, such as a stairway and a slope, may be available.

Furthermore, in FIGS. 2 and 6, examples in which the person in the back is hidden behind the person in the front have been illustrated, but such example in which a person in the back is hidden is not limited to this. For example, a person in the back may be hidden behind an object present in the front.

SUMMARY OF THE PRESENT DISCLOSURE

In the present disclosure, accident detection apparatus 20 includes possession detector 103 that detects a person and a possession which is an object carried by the person by using a captured image captured by camera 10, and accident determiner 104 that determines whether an accident has occurred based on movements of the person and the possession in the captured image captured by surveillance camera 10. Thus, it is possible to determine whether the accident has occurred based on the movements of the person and the possession; as a result, a detection failure of the occurrence of the accident can be reduced.

When determining that no accident has occurred based on the movement of the person, accident determiner 104 may determine whether an accident has occurred based on the movement of the possession. Thereby, when no accident is detected in accident detection processing based on the movement of the person, accident detection processing based on the movement of the possession is executed, and the processing load in accident determiner 104 is thus reduced.

Accident detection apparatus 20 may include display processor 106 that generates and output accident recognition UI 300 to monitor 50. When accident determiner 104 determines that an accident has occurred, display processor 106 may output, to monitor 50, at least one of: information indicating the occurrence of the accident; a captured image used for the determination; and an image (live image) which is being captured by surveillance camera 10 that has captured the captured image used for the determination. This allows the observer of monitor 50 to immediately notice the occurrence of the accident and to quickly recognize a situation of the accident.

In addition, when accident determiner 104 determines that the accident has occurred, display processor 106 may output, to monitor 50, information related to an accident that had occurred in the past at the place where the captured image used for the determination (i.e., accident history information) has been captured. This allows the observer of monitor 50 to analyze a cause of occurrence of the accident in detail.

The captured image used by accident determiner 104 for determination of occurrence of an accident may be an image captured later than the captured image used by possession detector 103 for detection of a possession. In addition, surveillance camera 10, which captures the captured image used by possession detector 103 for detection of a possession, may be different from the surveillance camera which captures the captured image used by accident determiner 104 for determination of occurrence of an accident. Thus, it is possible to improve the detection accuracy of a possession; as a result, a detection failure of occurrence of an accident can be reduced.

Incidentally, in the above description, the term "accident" can be replaced with terms such as "dangerous event" and "incident." Furthermore, in the above description, terms such as "specification," "determination," and "judgement" can be replaced with each other.

The embodiment according to the present disclosure has been described in detail with reference to the accompanying drawings. Note that, the above-described functions of accident detection apparatus 20 may be realized by a computer program.

Figure 7:
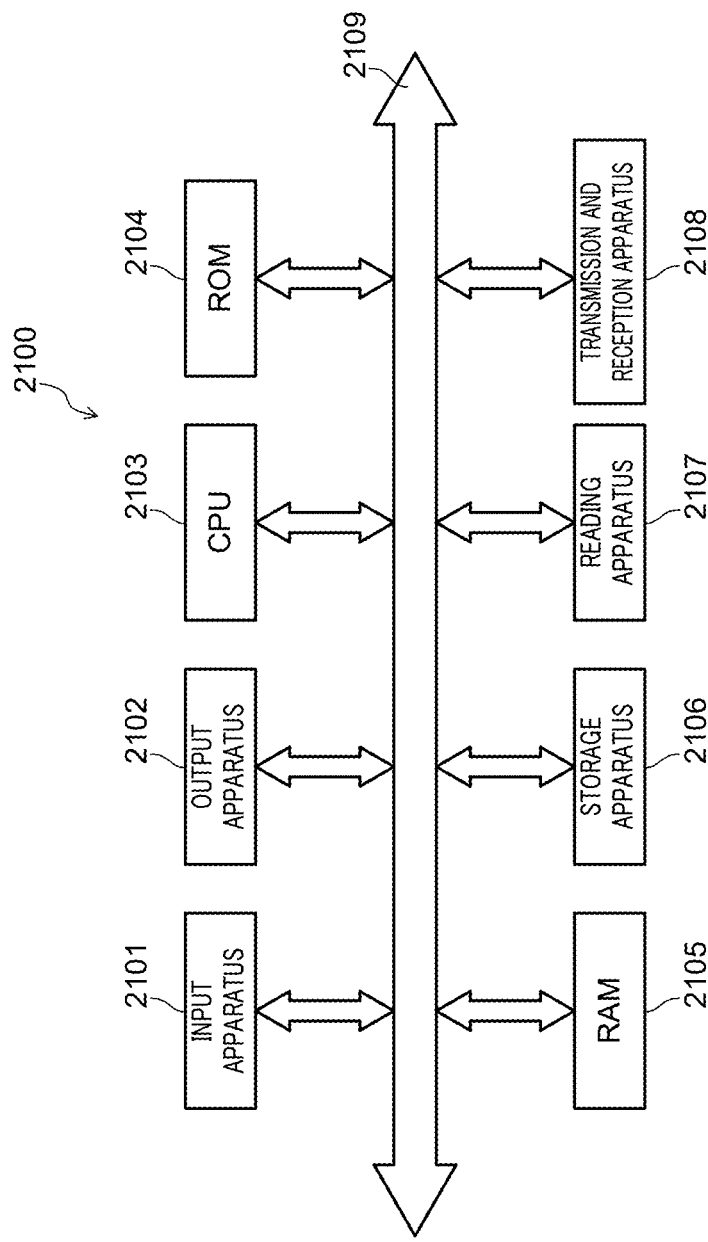
FIG. 7 illustrates an exemplary hardware configuration of the accident detection apparatus according to the present disclosure.

FIG. 7 illustrates an exemplary hardware configuration of a computer that realizes the functions of the respective apparatuses by the program. This computer 2100 includes input apparatus 2101 such as a keyboard, mouse, or touchpad, output apparatus 2102 such as a display or speaker, Central Processing Unit (CPU) 2103, Read Only Memory (ROM) 2104, Random Access Memory (RAM) 2105, storage apparatus 2106 such as a hard disk device or Solid State Drive (SSD), reading apparatus 2107 that reads information from a recording medium, for example, Digital Versatile Disk Read Only Memory (DVD-ROM) or Universal Serial Bus (USB) memory, and transmission and reception apparatus 2108 that performs a communication via network 30. The apparatuses are connected with each other via bus 2109.

Reading apparatus 2107 reads a program from the recording medium recording the program for realizing the functions of the respective apparatuses described above and stores the read program in storage apparatus 2106. Alternatively, transmission and reception apparatus 2108 communicates with a server apparatus connected to network 30 and stores, in storage apparatus 2106, a program for realizing the functions of the respective apparatuses downloaded from the server apparatus.

CPU 2103 then copies the program stored in storage apparatus 2106 to RAM 2105, sequentially reads an instruction included in the program from RAM 2105, and executes the read instruction, and thereby the functions of the respective apparatuses are realized.

Note that, the functional configuration illustrated in FIG. 3 and the hardware configuration illustrated in FIG. 7 are merely examples, and may be realized in such a manner that a plurality of apparatuses capable of communicating with each other cooperates with each other, respectively. An example of such configuration includes a configuration formed of an edge computer that performs some processing and a cloud server that performs the other processing. In this case, the cloud server may perform processing, such as person detection and possession detection, that can be also utilized by other systems, and/or processing with a relatively large load.

The disclosure of Japanese Patent Application No. 2019-051409, filed on Mar. 19, 2019, including the specification, drawings and abstract, is incorporated herein by reference in its entirety.

INDUSTRIAL APPLICABILITY

The aspect of the present disclosure is suitable for systems detecting accidents.

REFERENCE SIGNS LIST

1 Accident detection system
10 Surveillance camera
20 Accident detection apparatus
30 Network
40 Speaker
50 Monitor
101 Image receiver
102 Person detector
103 Possession detector
104 Accident determiner
105 Warning output
106 Display processor
107 Management table

The invention claimed is:

1. An accident detection system, comprising:
a camera device that captures an image of a predetermined area; and
an accident detection apparatus that includes a processor, the processer receiving, via a network, the image of the predetermined area captured by the camera device, and the processor detecting an occurrence of an accident using the image of the predetermined area, wherein the processor:
    detects a person and a possession which is an object in the possession of the person by using the image of the predetermined area;
    determines whether the accident has occurred, based on movements of the person of the predetermined area; and
    determines whether the accident has occurred based on a movement of the possession, when the processor determines that no accident has occurred based on the movements of the person.

2. The accident detection system according to claim 1, wherein
the processor outputs a determination that the accident has occurred and outputs an image used for the determination when the processor determines that the accident has occurred.

3. The accident detection system according to claim 1, wherein
the processor outputs a determination that the accident has occurred and outputs an image which is being captured by the camera device that has captured the image used for the determination, when the processor determines that the accident has occurred.

4. The accident detection system according to claim 1, wherein
the processor outputs a determination that the accident has occurred and outputs information on an accident that had occurred previously at a place where the image used for the determination has been captured, when the processor determines that the accident has occurred.

5. The accident detection system according to claim 1, wherein:
an image used by the processor for determination of occurrence of the accident is an image captured later than an image used for detection of the possession.

6. The accident detection system according to claim 1, wherein:
the camera device includes a plurality of cameras, and
a camera which captures an image used by the processor to detect the possession is different from a camera which captures an image used by the processor to determine the occurrence of the accident.

7. The accident detection system according to claim 1, wherein:
the processor determines that the accident has occurred when detecting a movement such as a fall or dropping of the possession from the image.

8. An accident detection method, comprising:
receiving, by a processor, via a network, an image of a predetermined area captured by a camera device;
detecting, by the processor, an occurrence of an accident using the image of the predetermined area;
detecting, by the processor, a person and a possession which is an object in the possession of the person by using the image of the predetermined area;
determining, by the processor, whether the accident has occurred, based on movements of the person in the image of the predetermined area; and
determining, by the processor, whether the accident has occurred based on a movement of the possession, when determining that no accident has occurred based on the movements of the person.

* * * * *